United States Patent
Jin

(10) Patent No.: US 11,105,273 B2
(45) Date of Patent: Aug. 31, 2021

(54) SYSTEM AND METHOD FOR AUTOMATICALLY CONTROLLING AN EXHAUST BRAKE OF A VEHICLE

(71) Applicants: HYUNDAI MOTOR COMPANY, Seoul (KR); KIA MOTORS CORPORATION, Seoul (KR)

(72) Inventor: Jung Hoon Jin, Namyangju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 12 days.

(21) Appl. No.: 16/381,546

(22) Filed: Apr. 11, 2019

(65) Prior Publication Data
US 2020/0165985 A1    May 28, 2020

(30) Foreign Application Priority Data
Nov. 28, 2018    (KR) .......................... 10-2018-0149135

(51) Int. Cl.
*F02D 9/06* (2006.01)
*B60K 35/00* (2006.01)

(52) U.S. Cl.
CPC ............... *F02D 9/06* (2013.01); *B60K 35/00* (2013.01); *B60K 2370/52* (2019.05); *F02D 2200/501* (2013.01); *F02D 2200/702* (2013.01)

(58) Field of Classification Search
CPC ............ F02D 9/06; F02D 2200/702; F02D 2200/501; F02D 13/0276; F02D 2700/04; F02D 2009/0242; B60K 35/00; B60K 2370/52

USPC ....................................................... 123/323
See application file for complete search history.

(56) References Cited

U.S. PATENT DOCUMENTS

| | | | |
|---|---|---|---|
| 5,146,890 A * | 9/1992 | Gobert | F02D 13/04 123/321 |
| 2001/0018384 A1* | 8/2001 | Onimaru | F16H 61/21 477/118 |
| 2002/0058568 A1* | 5/2002 | Ishiguro | F02D 9/06 477/115 |
| 2016/0280225 A1* | 9/2016 | Baum | B60W 40/076 |
| 2018/0244247 A1* | 8/2018 | Carlsson | B60T 8/172 |
| 2018/0244269 A1* | 8/2018 | Carlsson | B60W 30/143 |
| 2018/0274509 A1* | 9/2018 | Pedlar | F02N 11/0822 |
| 2018/0334973 A1* | 11/2018 | Hirschmann | B60W 30/18136 |
| 2019/0249606 A1* | 8/2019 | Mohlin | F02D 41/12 |
| 2020/0070658 A1* | 3/2020 | Speer | B60W 30/18109 |
| 2020/0156643 A1* | 5/2020 | Hu | B60W 10/26 |

* cited by examiner

*Primary Examiner* — Joseph J Dallo
*Assistant Examiner* — Scott A Reinbold
(74) *Attorney, Agent, or Firm* — Lempia Summerfield Katz LLC

(57) ABSTRACT

A system and a method for automatically controlling an exhaust brake of a vehicle may automatically operate an exhaust brake by automatically recognizing a downhill condition during vehicle traveling. The system and method may automatically operating the exhaust brake by determining whether a current vehicle speed is equal to or greater than a speed limit of a speed limit device together with automatically recognizing a downhill condition, thereby achieving safe traveling together with providing traveling convenience of a driver upon downhill traveling.

7 Claims, 3 Drawing Sheets

SYSTEM AND METHOD FOR AUTOMATICALLY CONTROLLING AN EXHAUST BRAKE OF A VEHICLE

CROSS-REFERENCE TO RELATED APPLICATION

This application claims under 35 U.S.C. § 119(a) the benefit of priority to Korean Patent Application No. 10-2018-0149135 filed on Nov. 28, 2018, the entire contents of which are incorporated herein by reference.

BACKGROUND

(a) Technical Field

The present disclosure relates to a system and a method for automatically controlling an exhaust brake of a vehicle, and more particularly, to a system and a method for automatically controlling an exhaust brake of a vehicle, which may prevent an increase in a vehicle speed and achieve safe traveling of the vehicle upon downhill traveling.

(b) Background Art

Generally, a commercial vehicle such as a truck is mounted with an exhaust brake device, which is an auxiliary brake, in addition to a foot brake that is a main brake device for when the vehicle travels a downward slope or at high speed.

The exhaust brake device is a device for reducing an engine output by forcibly blocking the exhaust gas discharged through an exhaust pipe communicated with an exhaust manifold, thereby decelerating the vehicle.

For this purpose, the exhaust brake device is configured to include an exhaust valve mounted on the exhaust pipe of the engine and to include an exhaust brake switch for operating a closing or opening of the exhaust valve.

Therefore, when the exhaust brake switch is turned on upon downhill traveling of the vehicle, the closing of the exhaust valve is operated and at the same time, the exhaust pipe is clogged. This generates a back pressure of the exhaust gas. Engine output resistance (e.g., rotation resistance of an engine crankshaft) due to the back pressure at this time is generated, thereby finally reducing the RPM of the engine to decelerate the vehicle.

In addition, even if an engine control is performed during traveling at a predetermined speed limit by using a speed limit device separately mounted in the vehicle, the vehicle travels at a speed limit or more due to an acceleration force upon downhill traveling, thus preferably operating the exhaust brake.

However, the exhaust brake is operated and released inconveniently only when a driver turns on/off the exhaust brake switch directly and manually upon downhill traveling. Thus, the exhaust brake switch should be operated every time traveling downhill. Furthermore, it is inconvenient that the driver should operate the exhaust brake switch every time traveling downhill even if the speed limit device is operated.

The above information disclosed in this Background section is only to enhance understanding of the background of the disclosure. Accordingly, the Background section may contain information that does not form the prior art that is already known in this country to a person of ordinary skill in the art.

SUMMARY

The present disclosure is intended to solve the problems noted above. An object of the present disclosure is to provide a system and a method for automatically controlling an exhaust brake of a vehicle. The system and method may automatically operate an exhaust brake by automatically recognizing a downhill condition during vehicle traveling. The system and method may automatically operate the exhaust brake by determining whether a current vehicle speed is equal to or greater than a speed limit of a speed limit device together with automatically recognizing a downhill condition, thereby achieving safe traveling together with providing traveling convenience of the driver upon downhill traveling.

An embodiment of the present disclosure for achieving the object provides a system for automatically controlling an exhaust brake of a vehicle. The system includes: a gradient sensing sensor for sensing a downward gradient during vehicle traveling; a speed sensor for sensing a current vehicle speed; an exhaust valve mounted on an exhaust pipe of an engine to be opened and closed by an actuator; and a controller for performing a closing control of the exhaust valve by driving the actuator when the current vehicle speed is equal to or greater than a certain vehicle speed and in addition, when a current downward gradient is equal to or greater than a reference gradient by receiving signals of the gradient sensing sensor and the speed sensor.

In addition, the system for automatically controlling the exhaust brake of the vehicle of the present disclosure may further include a speed limit device for transmitting a predetermined speed limit signal to the controller, a descending ramp safe traveling switch for transmitting On/Off signals to the controller for determining whether to automatically operate an exhaust brake, and an exhaust brake operating lamp for lighting upon the closing control of the exhaust valve by the controller.

Another embodiment of the present disclosure for achieving the object provides a method for automatically controlling an exhaust brake of a vehicle. The method includes: sensing a downward gradient during vehicle traveling in a gradient sensing sensor; sensing a current vehicle speed in a speed sensor; and performing a closing control of an exhaust valve mounted on an exhaust pipe for automatically operating an exhaust brake when the current vehicle speed is equal to or greater than a certain vehicle speed and in addition, when a current downward gradient is equal to or greater than a reference gradient by receiving signals of the gradient sensing sensor and the speed sensor in a controller.

In particular, the controller may perform an opening control of the exhaust valve when the current vehicle speed is smaller than a speed limit by comparing the speed limit and the current vehicle speed. The controller may perform a closing control of the exhaust valve when the current vehicle speed exceeds the speed limit when receiving a predetermined speed limit signal from a speed limit device before performing a closing control of the exhaust valve.

The controller may perform an exhaust valve closing control procedure for automatically operating the exhaust brake only when receiving an ON signal of a descending ramp safe traveling switch.

In addition, the method for automatically controlling the exhaust brake of the vehicle may further include lighting an exhaust brake operating lamp on an instrument panel when the controller performs the closing control of the exhaust valve.

The present disclosure provides the following effects through the above configurations.

First, by automatically operating the exhaust brake by sensing a downhill condition during vehicle traveling, it is not necessary for a driver to manually operate the exhaust brake switch, thereby providing traveling convenience to the driver, and achieving safe driving upon downhill traveling.

Second, although the speed limit device prevents an increase in the vehicle speed beyond the speed limit, it is not possible to prevent an increase in the speed due to gravity upon downhill traveling. Thus, it is possible to automatically operate the exhaust brake by determining whether the current speed is equal to or greater than the speed limit of the speed limit device, thereby further improving downhill traveling safety.

Third, it is possible to automatically control the operation of the exhaust brake based on vehicle traveling data (vehicle speed, gradient, and the like) to require no separate additional device, thereby preventing an increase in cost. Thus, it is possible to minimize the operation of the main brake upon downhill traveling, thereby preventing fade due to brake overheating, increasing the life of brake wear and the like.

Other aspects and illustrative embodiments of the disclosure are discussed herein.

It should be understood that the term "vehicle" or "vehicular" or other similar terms as used herein are inclusive of motor vehicles in general. Such motor vehicle can include passenger automobiles including sports utility vehicles (SUV), buses, trucks, various commercial vehicles, watercraft including a variety of boats and ships, aircraft, and the like, and can include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed herein.

BRIEF DESCRIPTION OF THE DRAWINGS

The above and other features of the present disclosure are described in detail with reference to certain embodiments thereof illustrated the accompanying drawings, which are given herein below by way of illustration only, and thus are not limitative of the present disclosure, and wherein.

Figure 1:
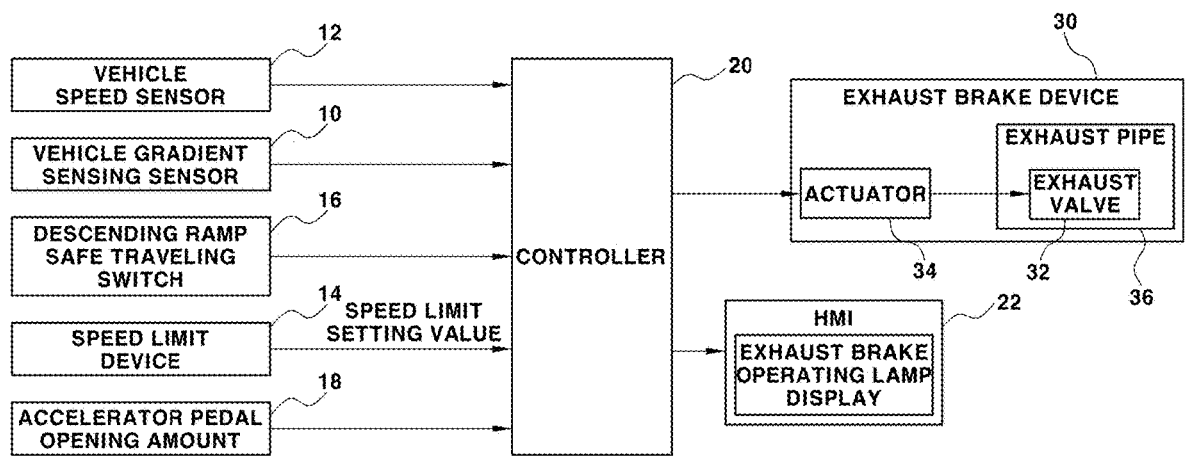
FIG. 1 is a block diagram illustrating a system for automatically controlling an exhaust brake of a vehicle according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined by the particular intended application and use environment.

In the figures, like reference numbers refer to the same or equivalent sections of the present disclosure throughout the several figures of the drawing.

DETAILED DESCRIPTION

Hereinafter, embodiments of the present disclosure are described in detail with reference to the accompanying drawings.

Figure 2:
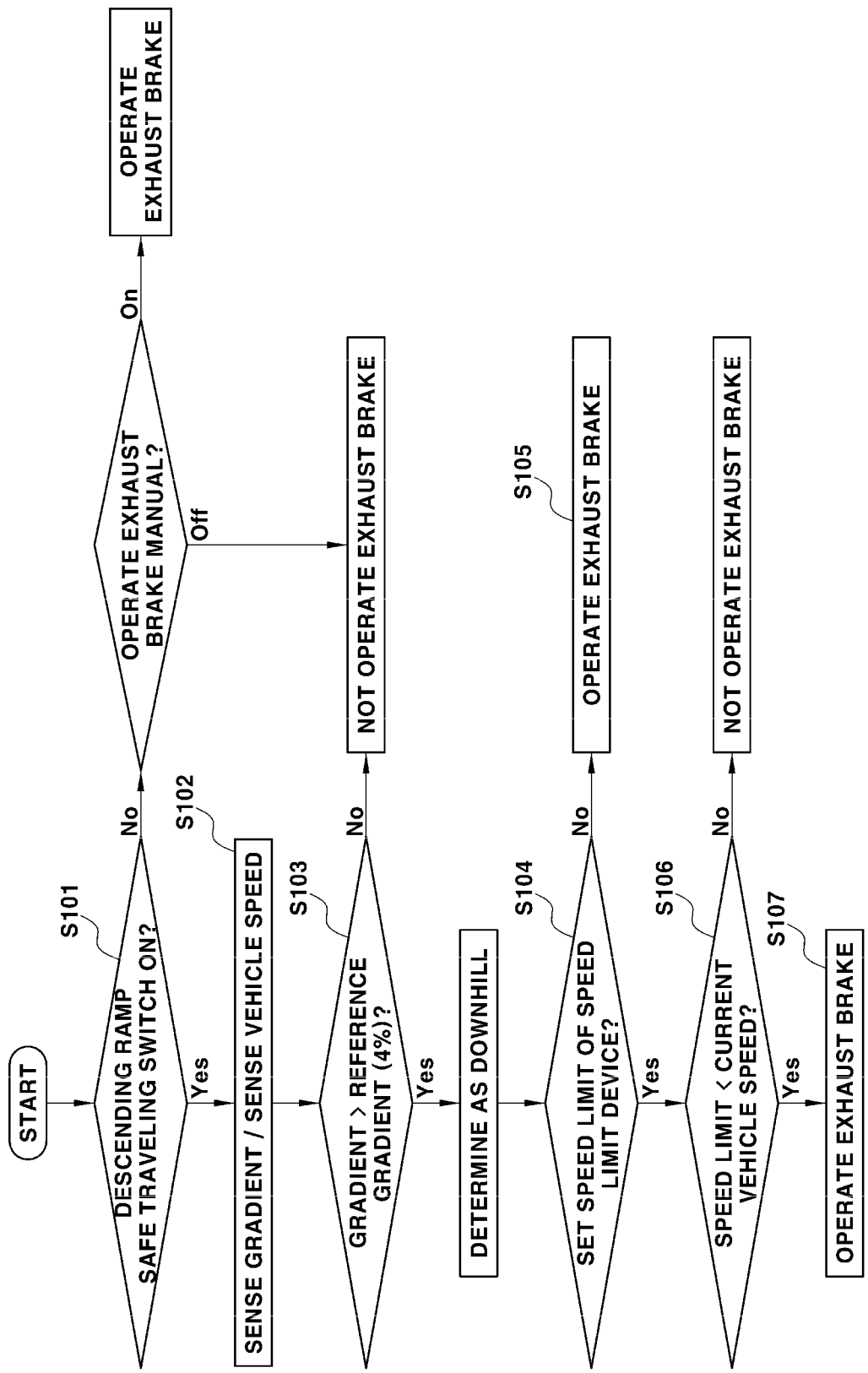
FIGS. 2 and 3 are flowcharts illustrating a method for automatically controlling the exhaust brake of the vehicle according to the present disclosure.

FIG. 1 is a block diagram illustrating a system for automatically controlling an exhaust brake of a vehicle according to the present disclosure. d FIG. 2 is a flowchart illustrating a method for automatically controlling the exhaust brake of the vehicle according to the present disclosure.

As illustrated in FIG. 1, as a means for determining whether to travel downhill during vehicle traveling, a gradient sensing sensor 10 and a speed sensor 12 are adopted.

The gradient sensing sensor 10 senses a downward gradient during vehicle traveling and transmits a sensed signal to a controller 20. The speed sensor 12 senses a current vehicle speed and transmits its sensed signal to the controller 20.

In addition, a speed limit device 14 for transmitting a predetermined speed limit signal is connected to the input side of the controller 20.

The speed limit device 14 is a device for blocking an engine output from increasing beyond the predetermined speed limit. For example, when the vehicle speed reaches the speed limit, various methods may be applied, such as a method for blocking the engine output from further increasing by a predetermined mapping data or logic stored in an engine ECU or the like.

In addition, a descending ramp safe traveling switch 16 is connected to the input side of the controller 20 in order to determine whether to automatically operate the exhaust brake.

The descending ramp safe traveling switch 16 is connected to the input side of the controller 20 to allow a driver to select whether to automatically operate the exhaust brake.

Therefore, when the driver normally travels in a state of turning on the descending ramp safe traveling switch 16, the controller 20 performs a control of automatically operating the exhaust brake upon downhill traveling based on the ON signal of the descending ramp safe traveling switch 16.

When the driver normally travels in a state of turning off the descending ramp safe traveling switch 16, the control of automatically operating the exhaust brake by the controller 20 is not performed. At this time, an operation of the exhaust brake may be performed by the driver manually operating the exhaust brake switch.

Meanwhile, an exhaust brake operating lamp 22, which lights in a closing control of the exhaust valve of the controller 20, is connected to the output side of the controller 20. Therefore, the driver may confirm that the exhaust brake is currently operating by checking the lighting state of the exhaust brake operating lamp 22.

The controller 20 determines whether a current vehicle speed is equal to or greater than a certain vehicle speed by receiving a signal of the speed sensor 12. The controller 20 determines whether a current slope of the vehicle, i.e., a downward gradient, is equal to or greater than a reference gradient by receiving a signal of the gradient sensing sensor 10.

As a result, when it is determined that a current vehicle speed is equal to or greater than a certain vehicle speed and in addition, that a current downward gradient of the vehicle is equal to or greater than a reference gradient, the controller 20 performs a control of automatically operating an exhaust brake, i.e., an exhaust brake device 30 by determining that the vehicle is traveling downhill.

The exhaust brake device 30 is configured to include an exhaust valve 32 that is openably and closably mounted on an exhaust pipe 36 connected to an exhaust manifold of the engine. The exhaust brake device 30 is also configured to include an actuator 34 for operating the opening/closing of the exhaust valve 32 by a control signal of the controller 20.

Therefore, when it is determined that a current vehicle speed is equal to or greater than a certain vehicle speed and in addition, when a current downward gradient of the vehicle is equal to or greater than a reference gradient, the controller 20 applies a closing-directional current signal to the actuator 34. Thus, the closing of the exhaust valve 32 is automatically operated by an operation of the actuator 34.

As described above, the closing of the exhaust valve 32 is automatically operated upon downhill traveling of the vehicle, such that the exhaust pipe 36 is clogged by the exhaust valve to generate a back pressure of the exhaust gas. Engine output resistance is generated by the back pressure at this time, thereby finally reducing the RPM of the engine to decelerate the vehicle.

As a result, by automatically operating the exhaust brake device 30 by sensing a downhill condition during vehicle traveling, it is not necessary for a driver to manually operate the exhaust brake switch, thereby providing traveling convenience to the driver and achieving safe driving upon downhill traveling.

Herein, a method for automatically controlling the exhaust brake device 30 of the present disclosure is described sequentially as follows.

First, the method determines whether to turn on/off the descending ramp safe traveling switch 16 [S101].

When a driver turns on the descending ramp safe traveling switch 16 in preparation for future downhill traveling, the controller 20 prepares a control of automatically operating the exhaust brake device 30 upon downhill traveling based on an ON signal of the descending ramp safe traveling switch 16.

Then, the method includes the gradient sensing sensor 10 sensing a downward gradient during vehicle traveling and transmitting its sensed signal to the controller 20. The method further includes the speed sensor 12 sensing a current vehicle speed and transmitting its sensed signal to the controller 20 [S102].

Subsequently, the controller 20 determines whether a current vehicle speed is equal to or greater than a certain vehicle speed based on the signal of the speed sensor 12. The controller 20 also determines whether a current slope of the vehicle, i.e., a downward gradient is equal to or greater than a reference gradient based on the signal of the gradient sensing sensor 10 [S103].

As a result, when it is determined that a current vehicle speed is equal to or greater than a certain vehicle speed and in addition, when a current downward gradient of the vehicle is equal to or greater than a reference gradient, the controller 20 performs a control of automatically operating the exhaust brake device 30 by determining that the vehicle is traveling downhill [S105].

When it is determined that a current vehicle speed is equal to or greater than a certain vehicle speed and in addition, when a current downhill gradient of the vehicle is equal to or greater than a reference gradient, the controller 20 further confirms whether the speed limit by the speed limit device has been set [S104]. Then, when the speed limit has not been set, the controller 20 performs a control of automatically operating the exhaust brake device 30 [S105].

At this time, the automatic operation of the exhaust brake device 30 is performed whereby the controller 20 applies a closing-directional current signal to the actuator 34, such that the closing of the exhaust valve 32 is automatically operated by a driving of the actuator 34.

As a result, the closing of the exhaust valve 32 is automatically operated upon downhill traveling of the vehicle, such that the exhaust pipe 36 is clogged by the exhaust valve 32 to generate a back pressure of the exhaust gas. Engine output resistance due to the back pressure at this time is generated, thereby finally reducing the RPM of the engine to decelerate the vehicle.

Meanwhile, as a result of confirming in step [S104], when the speed limit by the speed limit device has been set, the vehicle is not accelerated beyond the speed limit by the speed limit device of the vehicle, such that it may not be necessary to operate a separate exhaust brake device 30.

Nevertheless, in the case that the speed limit by the speed limit device has been set, when the controller 20 receives a predetermined speed limit signal from the speed limit device before performing a closing control of the exhaust valve 32, it compares the speed limit and the current vehicle speed [S106]. Then, when the current vehicle speed is less than the speed limit, the exhaust valve 32 is kept in the opened state, whereas, when the current vehicle speed exceeds the speed limit, the controller 20 performs a closing control of the exhaust valve 32 to operate the exhaust brake [S107].

In other words, even if the speed limit by the speed limit device has been set, when the current vehicle speed exceeds the speed limit due to an acceleration force upon downhill traveling of the vehicle, the closing control of the exhaust valve 32 is performed in order to operate the exhaust brake device 30 for safe traveling.

Meanwhile, the controller 20 performs an opening control of the exhaust valve 32 so that the operation of the exhaust brake device 30 is released when an opening amount is equal to or greater than a reference value by receiving an accelerator pedal opening amount signal from an accelerator pedal opening amount sensing sensor 18.

As described above, although the speed limit device prevents the vehicle speed from increasing beyond the speed limit, it may not prevent an increase in the speed due to gravity upon downhill traveling. Thus, it is possible to automatically operate the exhaust brake device 30 by determining whether a current speed is equal to or greater than the speed limit of the speed limit device, thereby further improving downhill traveling safety.

Figure 3:
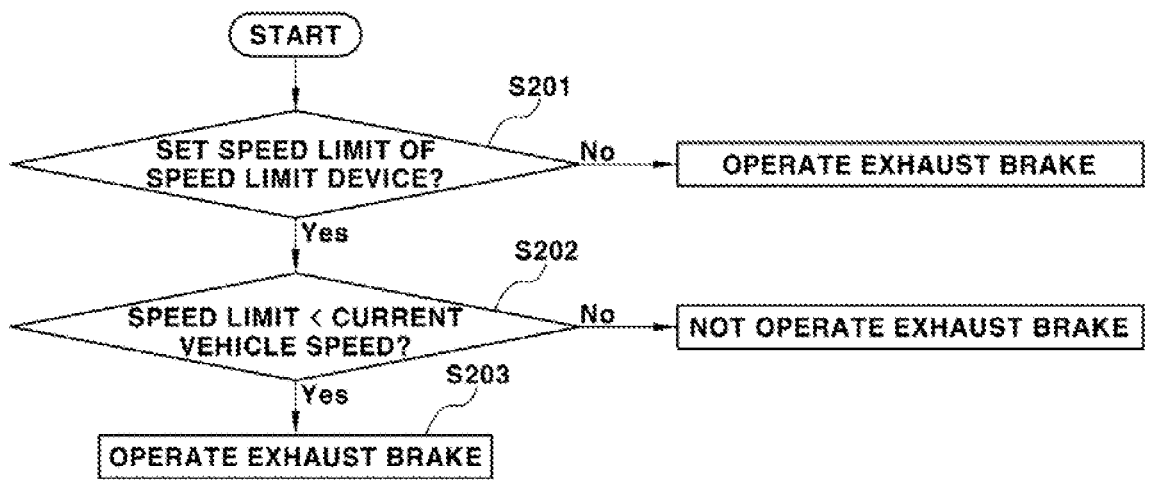

Meanwhile, as seen in the flowchart of FIG. 3, the method confirms whether the speed limit by the speed limit device has been set in the controller, even upon normal traveling, while excluding a procedure of confirming that the vehicle is traveling downhill [S201]. The method includes that, when the speed limit has been set, the speed limit and the current vehicle speed are compared with each other [S202]. The method includes that, when the current vehicle speed is less than the speed limit, the exhaust valve 32 is kept in the opened state and the exhaust brake device 30 is not operated, whereas, when the current vehicle speed exceeds the speed limit, it is determined that the speed limit device has failed to perform a closing control of the exhaust valve 32 so that the exhaust brake device 30 is operated [S203].

As a result, when the current vehicle speed exceeds the speed limit set by the speed limit device, not only upon downhill traveling but also upon normal traveling, it is possible to automatically operate the exhaust brake device so that the vehicle speed reduces to the speed limit or less, thereby achieving safer traveling.

What is claimed is:

1. A system for automatically controlling an exhaust brake of a vehicle, the system comprising:
   a gradient sensing sensor for sensing a downward gradient during vehicle traveling;
   a speed sensor for sensing a current vehicle speed;
   an exhaust valve mounted on an exhaust pipe of an engine to be opened and closed by an actuator;
   a controller for performing a closing control of the exhaust valve by driving the actuator when the current vehicle speed is equal to or greater than a certain vehicle speed and in addition, when a current downward gradient is equal to or greater than a reference gradient by receiving signals of the gradient sensing sensor and the speed sensor; and
   a speed limit device configured to set a predetermined speed limit and to transmit a predetermined speed limit signal to the controller, wherein the speed limit device is configured to block an engine output of the vehicle from increasing above the predetermined speed limit when the predetermined speed limit is set by the speed limit device,
   wherein, under a condition where the current vehicle speed is equal to or greater than the certain vehicle speed and the current downward gradient is equal to or greater than the reference gradient, the controller is configured to:
      check, before closing the exhaust valve, whether the predetermined speed limit is set by the speed limit device,
      close the exhaust valve when the predetermined speed limit is not set by the speed limit device, and
      when the predetermined speed limit is set by the speed limit device, keep the exhaust valve open in case the current vehicle speed is less than the predetermined speed limit and close the exhaust valve in case the current vehicle speed is equal to or greater than the predetermined speed limit, the speed limit being different from the certain vehicle speed.

2. The system of claim 1, further comprising a descending ramp safe traveling switch for transmitting On/Off signals for determining whether to automatically operate an exhaust brake to the controller.

3. The system of claim 1, further comprising an exhaust brake operating lamp for lighting upon the closing control of the exhaust valve by the controller.

4. A method for automatically controlling an exhaust brake of a vehicle, the method comprising:
   sensing a downward gradient during vehicle traveling using a gradient sensing sensor;
   sensing a current vehicle speed by a speed sensor;
   checking whether a predetermined speed limit is set by a speed limit device, wherein the speed limit device is configured to block an engine output of the vehicle from increasing above the predetermined speed limit when the predetermined speed limit is set by the speed limit device; and
   controlling opening and closing of an exhaust valve mounted on an exhaust pipe for automatically operating an exhaust brake based on the current vehicle speed and a current downward gradient,
   wherein, under a condition where the current vehicle speed is equal to or greater than a certain vehicle speed and a current downward gradient is equal to or greater than a reference gradient,
      checking, before closing the exhaust valve, whether the predetermined speed limit is set by the speed limit device,
      closing the exhaust valve when the predetermined speed limit is not set by the speed limit device, and
      when the predetermined speed limit is set by the speed limit device, keeping the exhaust valve open in case the current vehicle speed is less than the predetermined speed limit and closing the exhaust valve in case the current vehicle speed is equal to or greater than the predetermined speed limit, the speed limit being different from the certain vehicle speed.

5. The method of claim 4,
   wherein the controller performs an opening control of the exhaust valve when the current vehicle speed is less than the predetermined speed limit and greater than the certain vehicle speed.

6. The method of claim 4,
   wherein the controller performs an exhaust valve closing control procedure for automatically operating the exhaust brake only when receiving an ON signal of a descending ramp safe traveling switch.

7. The method of claim 4, further comprising lighting an exhaust brake operating lamp on an instrument panel upon the closing control of the exhaust valve by the controller.

* * * * *